July 3, 1928.

T. WALSH ET AL 1,675,438

VARIABLE SPEED TRANSMITTING MECHANISM

Filed Jan. 21, 1925     3 Sheets-Sheet 3

WITNESSES:

INVENTORS
Timothy Walsh
and Harry J. Coover
BY Joshua R.H. Potts
THEIR ATTORNEY

Patented July 3, 1928.

1,675,438

UNITED STATES PATENT OFFICE.

TIMOTHY WALSH AND HARRY S. COOVER, OF PHILADELPHIA, PENNSYLVANIA.

VARIABLE-SPEED-TRANSMITTING MECHANISM.

Application filed January 21, 1925. Serial No. 3,728.

This invention relates to variable speed transmitting mechanism especially designed for use on vehicles driven by internal combustion engines.

The objects are to provide mechanism in which the speed of the driven parts may be increased by infinitesimal increments to equal the speed of the driving parts; mechanism in which the component parts have an aggregate weight about a common axis so disposed as to serve as a fly wheel; and mechanism which will serve as a clutch and may be easily and accurately controlled to have any degree of holding power for any length of time without the danger of heating and injuring the clutching parts as is the case with the friction clutches now in use.

Figure 1:
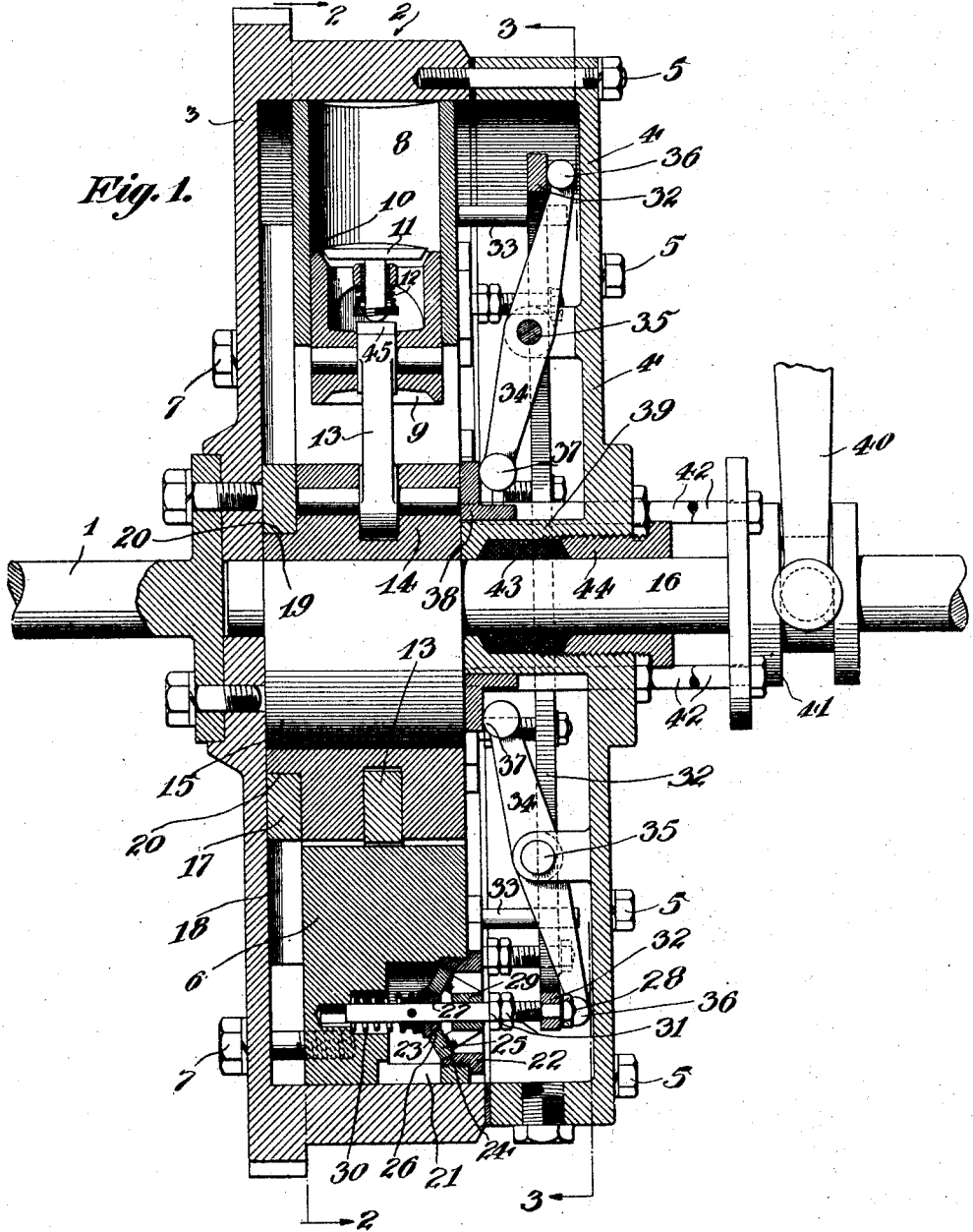
Figure 2:
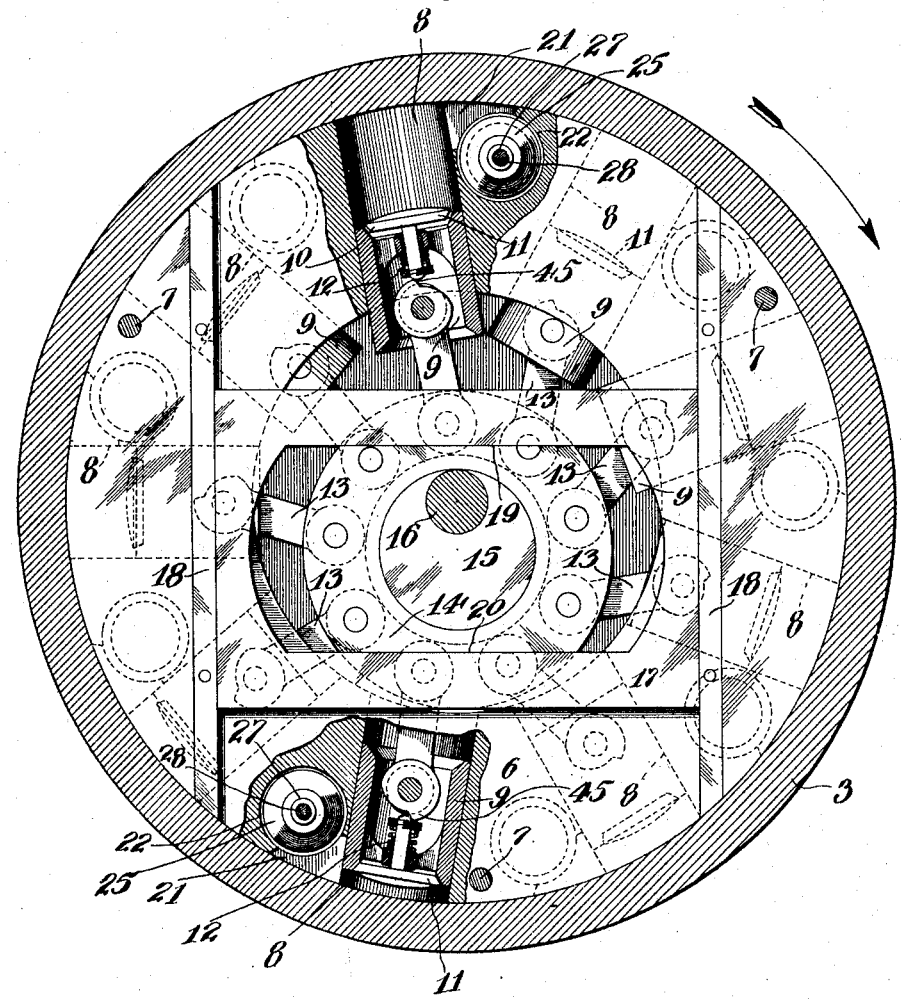
Figure 3:
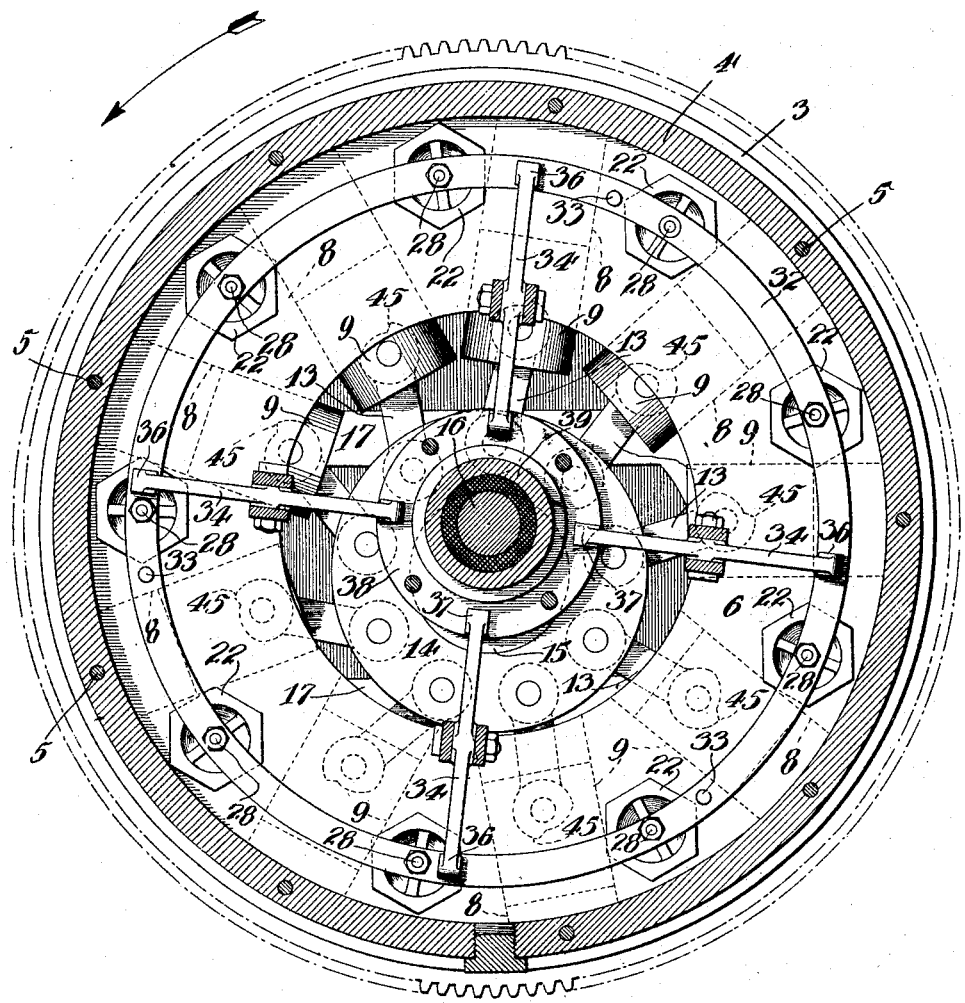

These objects, and other advantageous ends which will be described hereinafter, we attain in the following manner, reference being had to the accompanying drawings in which Figure 1 is a central section through variable speed mechanism constructed in accordance with our invention, Figure 2 a section on line 2—2 of Figure 1, and Figure 3 a section on line 3—3 of Figure 1.

Referring to the drawings, 1 indicates a driving shaft; 2 an oil-tight casing made in sections 3 and 4 connected to each other by bolts 5; 6 a circular block, hereinafter called a cylinder block, fitted in and secured to casing section 3 by bolts 7, and having radially extending cylinders 8 closed at their outer ends by casing section 3; 9 pistons slidable in the cylinders and having inlet ports 10; 11 inlet check valves, of the poppet type, for closing the ports, preferably held closed by springs 12; 13 links pivotally connected with the pistons; and 14 a collar connected with links 13 and rotatable on an eccentric 15 fixed to a driven shaft 16 rotatable in the casing. Rotating shaft 16 relatively to cylinder block 6, causes eccentric 15 to carry its collar 14 toward and from the cylinders and thereby reciprocate the pistons, or by rotating cylinder block 6 relatively to shaft 16, a reciprocating motion will be imparted to the pistons. Collar 14 is connected to cylinder block 6 by a guide 17, slidably mounted in a guideway 18 between the cylinder block and section 3, and having a guide slot 19 slidably fitting faces 20 of collar 14. Through this connection collar 14 receives rotation from block 6, during which guide 17 slides in one direction on cylinder block 6 while collar 14 slides at right angles to that direction in guide slot 19. This avoids binding between the block and collar when block 6 is rotated.

Outlet ports 21 in cylinder block 6 communicate with cylinders 8 and have removable outlet valves 22 mounted therein. Each valve has a small bleeder valve 23 which is easily opened to release the pressure on the outlet valve. The outlet valve consists of a seat 24 threaded to block 6 and a head 25. The bleeder valve consists of a seat 26 in head 25 and a bleeder head 27. A stem 28, is fixed to and moves bleeder head 27 into its open position and slides in a bore in the cylinder block and in a sleeve 29 integral with head 25. Heads 25 and 27 are held in closed position against their seats by a spring 30 between bleeder head 27 and the cylinder block. After the small bleeder head 27 is moved into open position to release the pressure on the large head 25, head 25 is moved into open position by nuts 31, adjustable on stem 28, coming into abutment with sleeve 29. Stems 28 are secured to and moved by a ring 32 slidably mounted on guide pins 33 fixed to cylinder block 6. Ring 32 is slid by levers 34, pivoted to the casing at 35, having their outer ends 36 abutting ring 32 and their inner ends 37 abutting a flanged collar 38 slidable on a boss 39 integral with casing section 4. Collar 38 is moved by a yoked lever 40 operatively connected with a grooved collar 41 connected with flanged collar 38 by bolts 42 passing through the casing. Section 4 is sealed against leakage by packing 43 and a gland nut 44.

The outlet valves 22 should be mounted to slide in lines parallel with the axis of rotation as they will otherwise be liable to be opened by centrifugal force.

Links 13 are provided at their outer ends with cam elements so disposed that they will engage and open the inlet valves on one side of a diametric line passing through the centers of eccentric 15 and shaft 16 but will not actuate the valves on the other side of that line. As the line is changeable, it will be convenient to designate it as the median line. With the parts in the position shown in Figure 2, the median line will bisect the figure from top to bottom and the cams will be non-operative on the right side and operative on the left side.

In operation, the speed of driven shaft 16 may be increased gradually until it equals the speed of driving shaft 1, the mechanism may serve as a clutch for connecting the driving shaft 1 with the driven shaft 16, and the aggregate weight of the component parts of the above mechanism will serve as a fly wheel.

The operation is as follows:—

Assuming that the casing is filled with oil, outlet valves 22 open and the driving shaft in motion, the car will be idle and the cylinder block will rotate relatively to eccentric 15 and driven shaft 16. During this rotation, pistons 9 will reciprocate and oil will be sucked into the cylinders through the inlet valves and discharged therefrom through the outlet valves. There being no material resistance to movement of the oil, the casing will rotate about the eccentric without turning it. Partial closing of the outlet valves will establish resistance to movement of the pistons which tends to rotate eccentric 15 and shaft 16, the tendency increasing as the resistance increases.

At this stage, the pistons on one side of the median line will move out of the cylinders and suck oil in, while those on the other side will move into the cylinders and force oil out.

When the outlet valves are fully closed, the oil having no escape from the cylinders in which the pistons have been moving outward, movement of these pistons will be blocked. This will block rotation of links 13, collar 14, eccentric 15 and shaft 16 relatively to driving shaft 1 and the cylinder block, rotary motion will thereby be transmitted from driving shaft 1 to driven shaft 16 and the entire mechanism will rotate as a unit, and the car will be driven at full speed.

In coasting, collar 14 will be driven by the rear wheels of the car and rotated at greater speed than the cylinder block. Its advance movement relatively to the cylinder block will cause links 13 to withdraw the pistons which have been pressing outwardly, those on the right as shown in Figure 2. This will cause suction in their cylinders which will open the valves. The cylinders on the left being open due to the action of the cams, oil will be free to circulate in the casing, and the car will be free to coast.

When the effect of the accelerated movement of collar 14 due to the driving force exerted by the rear wheels of the car, is exhausted and the driving force of the engine again takes effect, the pistons are automatically restored to the position they occupied before the coasting began, and the clutch is again effective. In the absence of the cams, the inlet valves on the left, as viewed in Figure 2, would be closed, the oil could not circulate in the casing, the car would be under the domination of the driving shaft and coasting would be impossible.

It will be seen that with the mechanism above described, a driving shaft may be connected to transmit movement of any degree to the driven shaft without the use of a clutch or speed change gears.

While we have described our invention as taking a particular form, it will be understood that the various parts may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. Variable speed transmitting mechanism including a rotatably mounted oil-tight casing; an annular block secured within the casing; cylinders extending radially inward from the periphery of the block and closed at their outer ends by the casing; pistons slidable in the cylinders; inlet ports in the pistons; valves for closing the ports; springs normally closing the valves; a shaft rotatably mounted in the casing; an eccentric fixed thereto; a collar rotatably mounted on the eccentric; links connecting the pistons with the collar; outlet ports, in the cylinder block, communicating with the cylinders; outlet valves mounted in the outlet ports; stems for controlling said valves, and means for manually actuating the stems.

2. Variable speed transmitting mechanism including a rotatable member provided with radial cylinders; a shaft; means connected with the shaft for causing fluid to pass into and from the cylinders; outlet valves on the rotatable member for controlling the passage of fluid from the cylinders; stems for controlling the valves; a slidably mounted ring connnected with the stems; levers pivoted on the rotatable member and having an arm abutting the ring, and manually operated means extending through the casing for moving the levers to actuate the valves.

3. Variable speed transmitting mechanism including a rotatable member provided with radial cylinders; a shaft; means connected with the shaft for causing fluid to pass into and from the cylinders; outlet valves on the rotatable member for controlling the passage of fluid from the cylinders; guide pins on the rotatable member; a ring slidable on the guide pins; connections between the rings and the valves; arms pivoted on the rotatable member having one end abutting the ring; and manually operated means passing through the casing for moving the arms to actuate the valves.

4. Variable speed transmitting mechanism including a rotatable casing; an annular block secured within the casing and provided with radial cylinders; a shaft; means connected with the shaft for causing fluid to pass into and from the cylinders; outlet valves on the cylinder block for controlling the passage of fluid from the cylinders; stems for controlling the valves; a slidably mounted ring secured to the stems; a boss extending inwardly from the casing; a flanged collar slidable thereon; levers pivoted to the casing, having one arm abutting the ring and the other arm abutting the flanged collar, and manually operated means extending out of the casing for moving the flanged collar to actuate the valves.

5. Variable speed transmitting mechanism including a rotatable block having cylinders therein; pistons adapted to reciprocate in the cylinders; means for controlling the passage of fluid into the cylinders; an outlet valve in the block; a bleeder valve seated in the main outlet valve, and a stem fixed to the bleeder valve and an abutment on the stem adapted to actuate the main outlet valve, the stem having its axis parallel with the axis of rotation of the cylinder block.

6. Variable speed transmitting mechanism including a rotatable block having cylinders therein; pistons adapted to reciprocate in the cylinders; means for controlling the passage of fluid into the cylinders; an outlet valve in the block; a bleeder valve seated in the main outlet valve; a stem fixed to the bleeder valve and an abutment on the stem adapted to actuate the main outlet valve, the stem having its axis parallel with the axis of rotation of the cylinder block, and resilient means for holding the valves to their seats.

7. Variable speed transmitting mechanism including a driving shaft; a cylinder block rotatable with the driving shaft; pistons adapted for reciprocation in the cylinders, each piston having a port and a valve seat around the port; an inlet valve head slidable in each piston; resilient means for holding the valves to their seats; a driven shaft, and connections between the driven shaft and the pistons including an eccentric on the shaft and cam elements adapted to engage and open the inlet valves on one side of a median line passing through the center of the eccentric and the driven shaft.

8. Variable speed transmitting mechanism including a driving shaft; a cylinder block rotatable with the driving shaft; pistons adapted for reciprocation in the cylinders, each piston having a port and a valve seat around the port; an inlet valve head slidable in each piston; resilient means for holding the valves to their seats; a driven shaft, and connections between the driven shaft and the pistons including an eccentric on the shaft, a collar rotatable on the eccentric and links connecting the collar with the pistons, the links having cam elements adapted to engage and open the inlet valves on one side of a median line passing through the center of the eccentric and the driven shaft.

9. Variable speed transmitting mechanism including a casing; a cylinder block mounted thereon and having a recess opposing the casing and with the casing forming a guideway; pistons slidable in the cylinders; valves for allowing fluid to pass to and from the cylinders; a shaft; an eccentric on the shaft; a collar on the eccentric, valves for allowing fluid to pass to and from the cylinders, and a guide slidably mounted in the guideway and slidably connected with the collar.

In testimony whereof we have signed our names to this specification.

TIMOTHY WALSH.
HARRY S. COOVER.